United States Patent
O'Toole

(10) Patent No.: US 7,788,704 B2
(45) Date of Patent: Aug. 31, 2010

(54) METHOD AND SYSTEM FOR SECURE CONNECTION OF PERIPHERAL DEVICE TO PROCESSING DEVICE

(75) Inventor: James O'Toole, Somerville, MA (US)

(73) Assignee: Cisco Technology, Inc., San Jose, CA (US)

( * ) Notice: Subject to any disclaimer, the term of this patent is extended or adjusted under 35 U.S.C. 154(b) by 1035 days.

(21) Appl. No.: 11/227,360

(22) Filed: Sep. 15, 2005

(65) Prior Publication Data

US 2007/0061866 A1     Mar. 15, 2007

(51) Int. Cl.
G06F 7/04 (2006.01)
G06F 15/16 (2006.01)
G06F 17/30 (2006.01)
H04L 29/06 (2006.01)

(52) U.S. Cl. .................. 726/3
(58) Field of Classification Search ........... None
See application file for complete search history.

(56) References Cited

U.S. PATENT DOCUMENTS 6,308,227 B1 * 10/2001 Kumar et al. ............ 710/4
6,772,331 B1 * 8/2004 Hind et al. ............ 713/151
7,436,300 B2 * 10/2008 Glass et al. ............ 340/568.1
2002/0080967 A1 * 6/2002 Abdo et al. ............ 380/270
2004/0192413 A1 * 9/2004 Frank ............ 455/574

OTHER PUBLICATIONS

Christian Gehrmann, Kaisa Nyberg, Enhancements to Bluetooth Baseband Security, Ericsson Mobile Communcations AB, Ericsson Research.

* cited by examiner

Primary Examiner—Nasser Moazzami
Assistant Examiner—Trong Nguyen
(74) Attorney, Agent, or Firm—Trellis IP Law Group, PC

(57) ABSTRACT

A method, system and apparatus are provided for securely connecting a peripheral device to a processing device in a wireless network. The peripheral device makes a request for access to the processing device, which generates a challenge message and prompts a user to respond. The peripheral device is allowed access to the processing device, based on the user's response. If the user's response validates the challenge message, access is allowed; otherwise it is disallowed.

18 Claims, 6 Drawing Sheets

METHOD AND SYSTEM FOR SECURE CONNECTION OF PERIPHERAL DEVICE TO PROCESSING DEVICE

BACKGROUND OF THE INVENTION

1. Field of Invention

Embodiments of the invention relate in general to wireless peripheral devices. More specifically, the embodiments of the invention relate to methods and systems that securely connect wireless peripheral devices to processing devices.

2. Description of the Background Art

Various input and output devices, such as printers, keyboards, mice, fax machines, copiers, scanners, telephones, headphones, goggles, digital cameras, etc., are becoming networked. These devices can communicate with processing devices on various types of networks, such as local area network (LAN), wide area network (WAN), and personal area network (PAN). Processing devices can be personnel computers, general-purpose computers, and so forth.

A high-end printer may be attached to the processing device via a network interface. The network interface includes a full transmission control protocol Internet protocol (TCP/IP) stack and a controlling microprocessor. Similarly, an input device such as a mouse, keyboard, etc., can be attached to a personal computer by means of universal serial bus (USB), infrared (IR), or wireless protocol such as Bluetooth, instead of a dedicated serial port connector. Different ways of connecting peripherals by using shared network media result in various types of security problems, depending on the media, threat model, consequences of a successful attack, and the nature of the device itself.

For example, a high-end network-attached printer may be enabled for monitoring usage or restricting access. Such a device has a computer that can be programmed to implement request and response protocols, and authenticating sessions (printing requests or administrative requests). These protocols may be similar to protocols used by other client/server systems. The high-end network-attached printers can authenticate users by using Windows NT™ credentials, Kerberos, etc. The username and password may be verified by using techniques such as remote area dial in user service (RADIUS), lightweight directory access protocol (LDAP) servers, etc.

Input peripheral devices such as wireless keyboards and mice pose an access-control problem. A wireless mouse or keyboard attached to a computer may affect inputs to other computers. This problem can be solved by embedding public-key encryption-capable microcontrollers and biometric sensors in these devices. The access can then be restricted by means of an elaborate combination of biometric identity and secure socket layer (SSL)-quality encryption on the data flow from the input device to the computer. However, biometric and SSL-quality encryption requires additional hardware with the input peripheral devices. The additional hardware results in increased cost of the input peripheral devices.

The conventional techniques described above are not easy to use. Moreover, these techniques involve encryption requirements that are not met by the existing input peripheral devices.

DETAILED DESCRIPTION OF EMBODIMENTS OF THE INVENTION

The embodiments of the invention provide a method, a system, an apparatus and a machine-readable medium for securely connecting a peripheral device wirelessly to a processing device.

In one embodiment of the invention, a method is provided for securely connecting a wireless peripheral device to a processing device in a communication network. The method includes (i) generating a challenge message; (ii) prompting the user for a response to the challenge message; and (iii) allowing the peripheral device access to the processing device, according to the response from the user.

In another embodiment of the invention, a system is provided for the secure connection of a wireless peripheral device to a processing device on a communication network. The system includes (i) means for generating a challenge message; (ii) means for prompting a user for authentication of the challenge message; and (iii) means for allowing the peripheral device access to the processing device, based on user's response.

In further embodiments of the present invention, a machine-readable medium, with instructions, is provided for the secure connection of a wireless peripheral device to a processing device on a communication network. The instructions executable by the machine-readable medium include (i) one or more instructions for generating a challenge message; (ii) one or more instructions for prompting a user for authentication of the challenge message; and (iii) one or more instructions for allowing the peripheral device access to the processing device, based on user's response.

Figure 1:
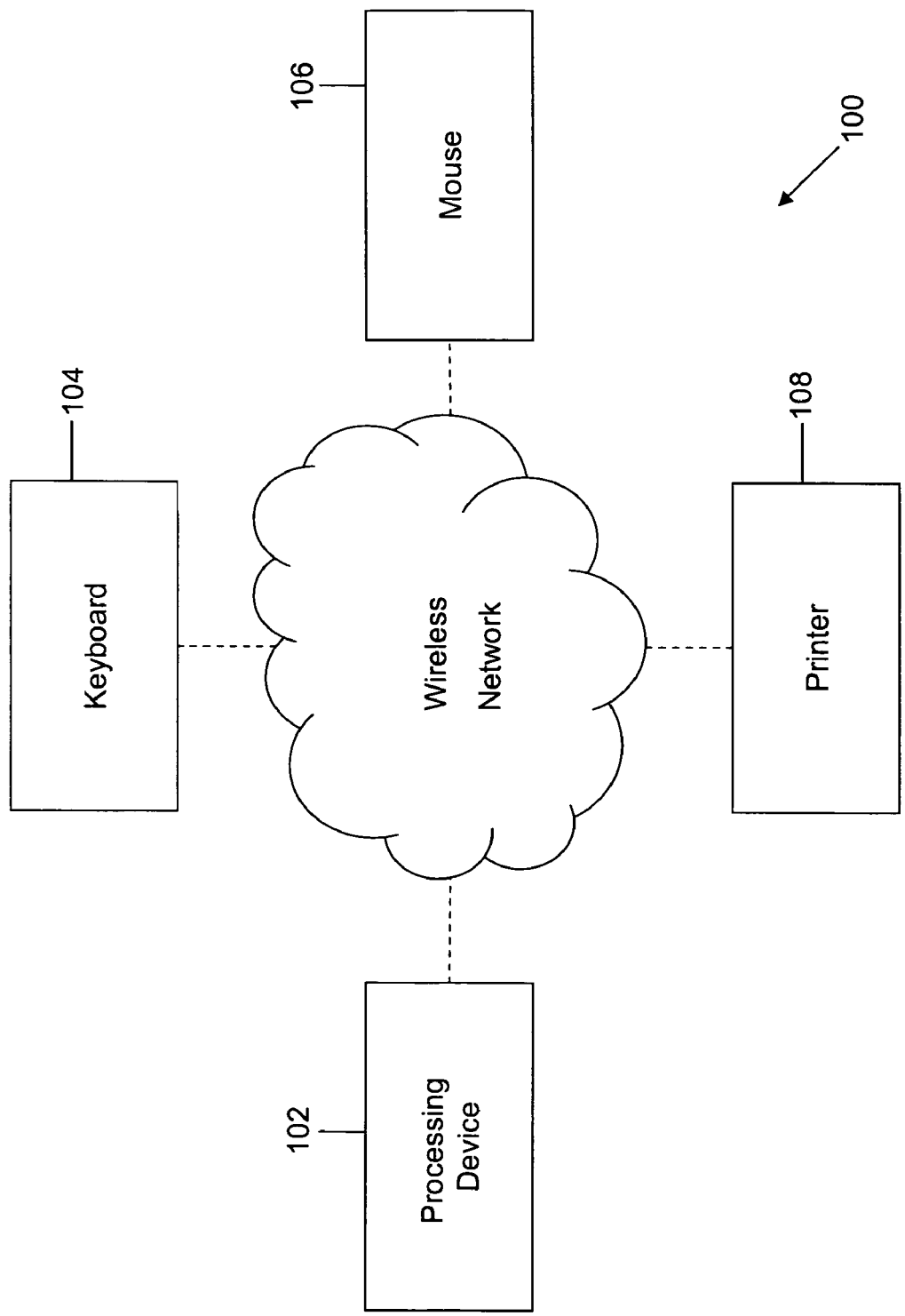
FIG. 1 illustrates an exemplary environment, wherein the embodiments of the invention can be practiced.

FIG. 1 illustrates an exemplary wireless network 100, wherein the embodiments of the invention can be practiced. Wireless network 100 includes a processing device 102, and peripheral devices such as a keyboard 104, a mouse 106, and a printer 108, in accordance with an exemplary embodiment of the present invention. In an embodiment of the invention, processing device 102 can be a personal computer, a general-purpose computer, a laptop, a palmtop, etc. In another embodiment of the invention, processing device 102 can be a computer with wired peripherals such as a wired keyboard, which can be operated by means of a wireless mouse. In another embodiment of the invention, processing device 102 can be a processing device in a home-media networking device, a home-automation device, and so forth. Home-media networking devices can include devices such as MediaMax™ from Axonix Corporation. Home-automation devices may be devices such as Omni™ from Home Automation Inc., LynX- 10™ from Marrick Ltd. and devices from Insteon™. In an embodiment of the invention, processing device 102 is connected to a display device. The display device can be a video monitor. Wireless network 100 can include Local Area Network (LAN)-networked devices such as printers, as well as micro/pico-networked peripherals as in Bluetooth or ad-hoc Wireless Fidelity (Wi-Fi), used to connect desktop peripherals such as keyboards, mice, tables, goggles, headphones to a desktop computer or a laptop. Wireless network 100 can also be a personal area network (PAN), a virtual area network (VAN), and so forth.

In accordance with various embodiments of the invention, peripheral devices such as keyboard 104 communicate on wireless network 100 by means of various technologies such as 802.11, pulse-code-modulated infrared, AM-wireless, Bluetooth, and so forth.

Figure 2:
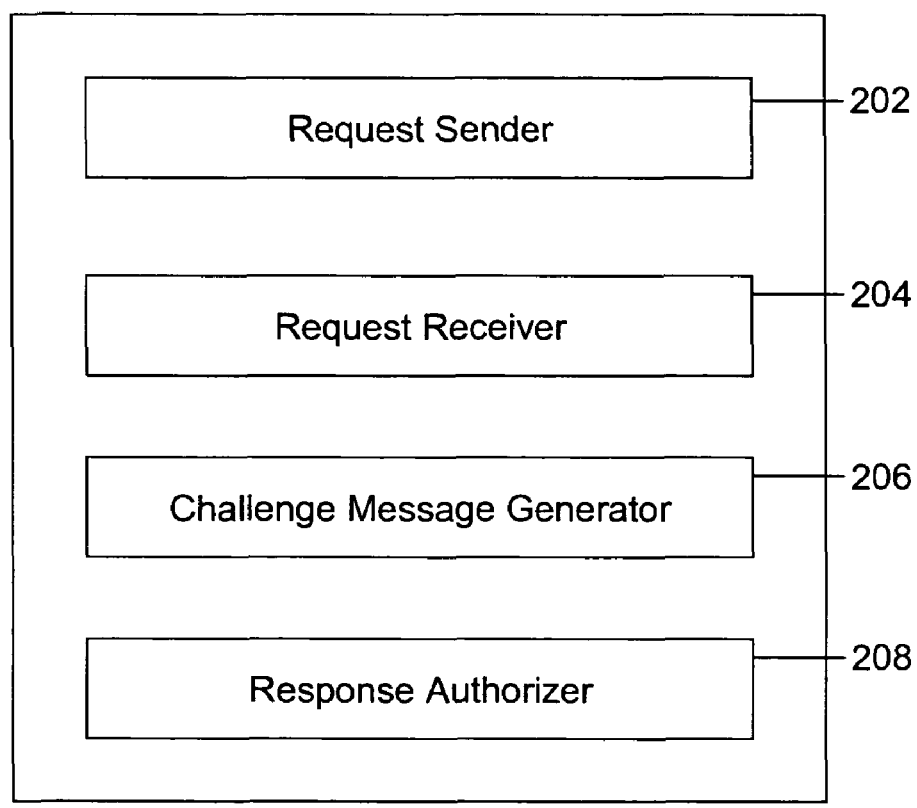
FIG. 2 illustrates a system for connecting a peripheral device to a processing device, in accordance with an exemplary embodiment of the present invention.

FIG. 2 illustrates a system 200 for connecting a peripheral device such as keyboard 104 to processing device 102, in accordance with an exemplary embodiment of the present invention. System 200 ensures a secure connection between peripheral devices such as keyboard 104 and processing device 102. System 200 includes a request sender 202, a request receiver 204, a challenge message generator 206, and a response authorizer 208.

Request sender 202 sends a request for access to processing device 102. In an embodiment of the invention, request sender 202 can reside in each of the peripheral devices and processing device 102. Request receiver 204 of processing device 102 receives the request for access sent by keyboard 104. Challenge message generator 206 of processing device 102 generates a challenge message. Response authorizer 208 prompts a user to respond to the challenge message. Thereafter, the user's response is matched to the challenge message. If this is successful, keyboard 104 is allowed access to processing device 102. Further, the status of the request, i.e., whether the access is allowed or not, is displayed to the user by response authorizer 208. The display can be in the form of an audio or visual signal, or their combination thereof. In an embodiment of the invention, the status of the request is displayed on the display device.

In accordance with an embodiment of the invention, the challenge message may be, for example, a random set of characters, a device identification string, and so forth. In another embodiment of the invention, the device identification string may be the corresponding serial number, model number, etc., of the peripheral device. In another embodiment of the invention, the challenge message may be an audio signal, an image etc.

In various embodiments of the invention, elements of system 200 can be implemented in the form of software, hardware, firmware, or their combination thereof.

Figure 3:
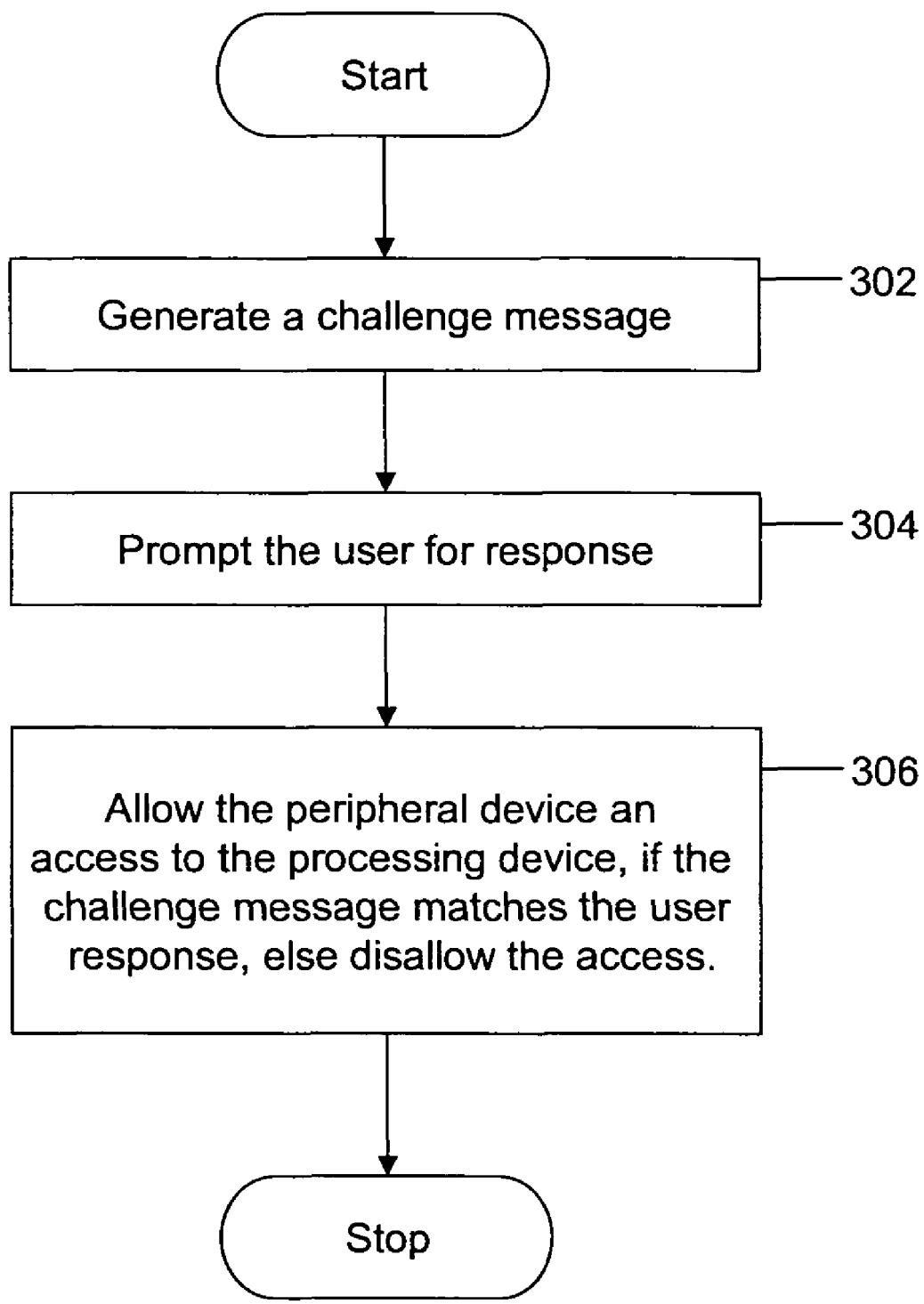
FIG. 3 is a flowchart depicting a method for connecting peripheral devices to a processing device, in accordance with an exemplary embodiment of the present invention.

FIG. 3 is a flowchart depicting a method for connecting peripheral devices to a processing device, in accordance with an exemplary embodiment of the present invention. For the purpose of illustration, the method is described by using keyboard 104 as the peripheral device. However, the methods and systems described in various embodiments of the invention are applicable for any wireless-enabled peripheral device.

Processing device 102 receives a request for access from keyboard 104. In an embodiment of the invention, the request is made by pressing a "Bind-to-Computer" button from keyboard 104. In another embodiment of the invention, the user presses a function key from keyboard 104 to transmit the device identification string of keyboard 104 as request for access. Subsequently, the challenge message is generated at step 302. Thereafter, the user is prompted to respond to the challenge message at step 304. In an embodiment of the invention, the display device is used to prompt the user. For example, the device identification string is displayed on the display device. In an embodiment of the invention, the user responds to the challenge message by matching and conforming the displayed device identification string as printed on label of keyboard 104. At step 306, the user's response is matched to the challenge message. Keyboard 104 is allowed access to processing device 102 if the user's response matches the challenge message; otherwise access is disallowed. To summarize, the method described in this embodiment of the invention attempts to assure processing device 102 and the end user that the peripheral device the user is typing on is the same one from which processing device 102 is receiving inputs.

Figure 4:
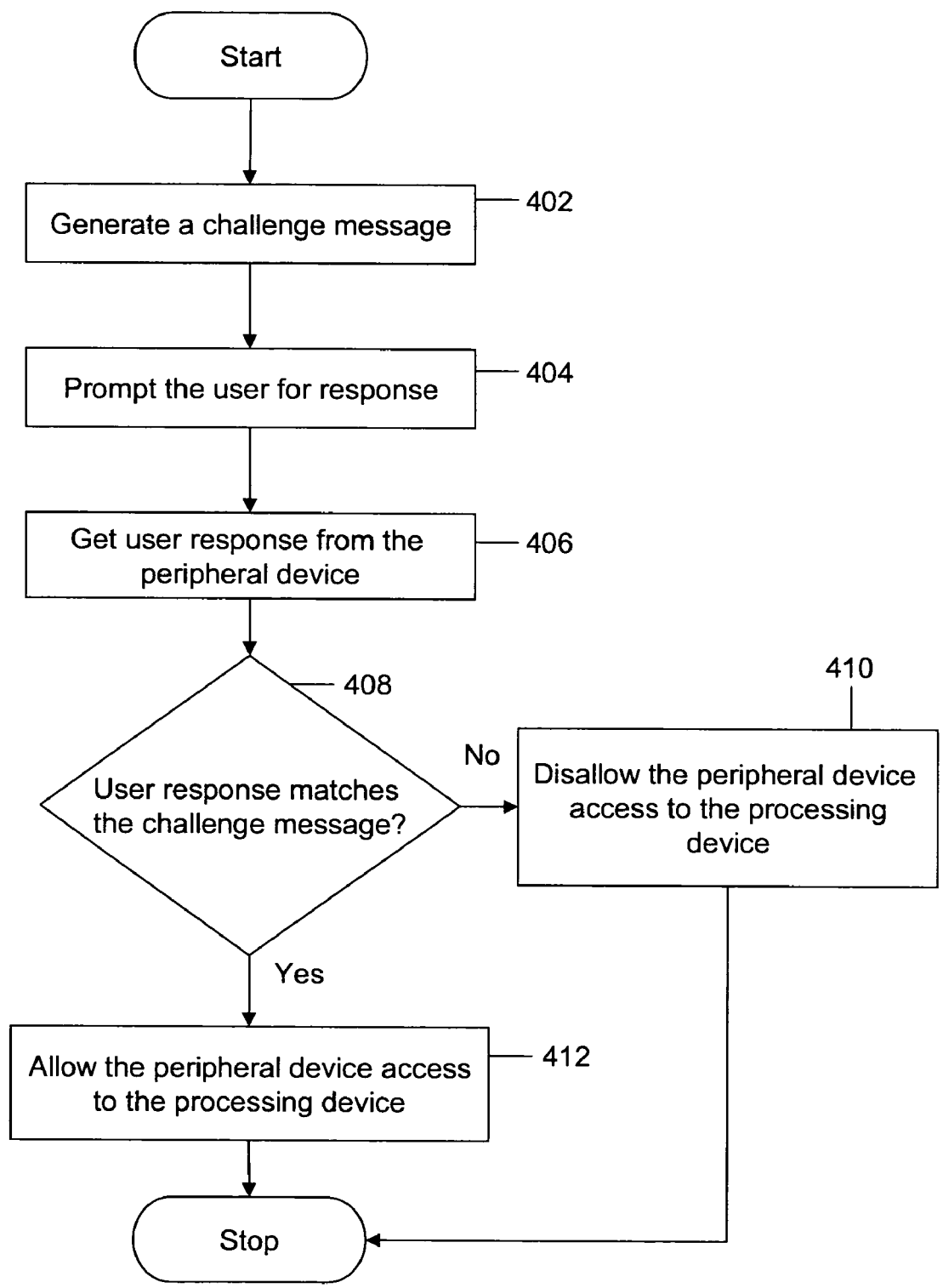
FIG. 4 is a flowchart depicting a detailed method for connecting a peripheral device to a processing device, in accordance with an exemplary embodiment of the present invention.

FIG. 4 is a flowchart of a detailed method for securely connecting mouse 106 to processing device 102, in accordance with an exemplary embodiment of the present invention. Processing device 102 receives the request for access from mouse 106. At step 402, the challenge message is generated. The challenge message may be the device identification string for mouse 106. Subsequently, processing device 102 prompts the user to respond to the challenge message at step 404. In an embodiment of the invention, the display device is used to prompt the user. The user responds by clicking mouse 106 and confirming the device identification string displayed at step 406. For example, the user may click on the prompt for response displayed on the display device. In an embodiment of the invention, the user may enter the challenge message by using keyboard 104. Thereafter, the user confirmation response is matched to the challenge message at step 408. Mouse 106 is allowed access to processing device 102 at step 412, if the process of matching is successful; otherwise access is disallowed at step 410. For the purpose of illustration, the method is described by using the challenge message as the device identification string. However, the methods and systems described in various embodiments of the invention are applicable for any challenge message.

Figure 5:
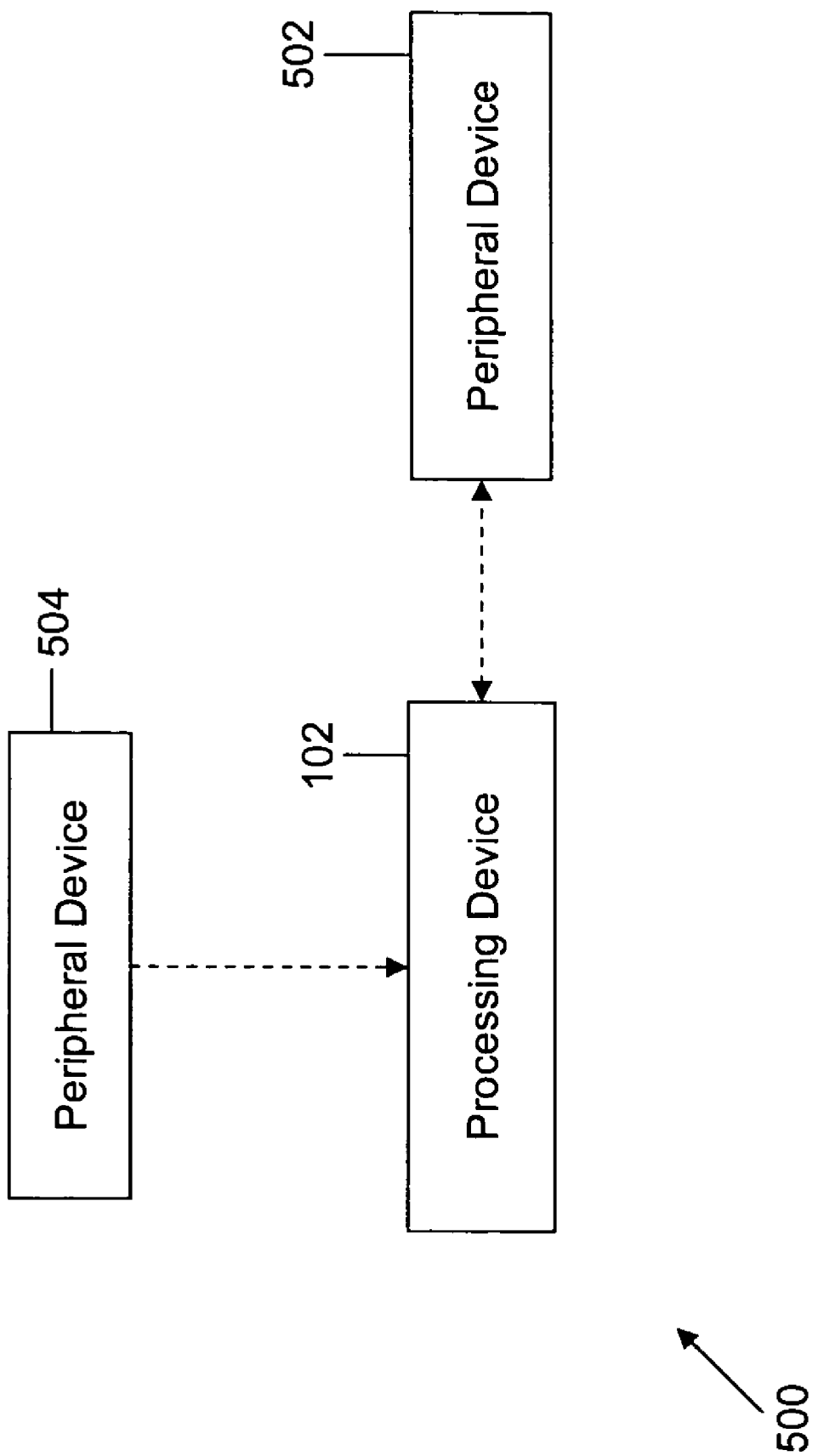
FIG. 5 shows a block diagram of a system for connecting a peripheral device to a processing device, in accordance with another exemplary embodiment of the present invention.

FIG. 5 illustrates a block diagram of a system 500 comprising processing device 102 and peripheral devices 502 and 504, in accordance with an exemplary embodiment of the present invention. Peripheral device 502 is securely communicating with processing device 102 on a wired or wireless connection. In accordance with an embodiment of the invention, peripheral device 502 is a keyboard. Subsequently, another peripheral device 504 requests processing device 102 for access. In accordance with an embodiment of the invention, peripheral device 504 can be a mouse.

Figure 6:
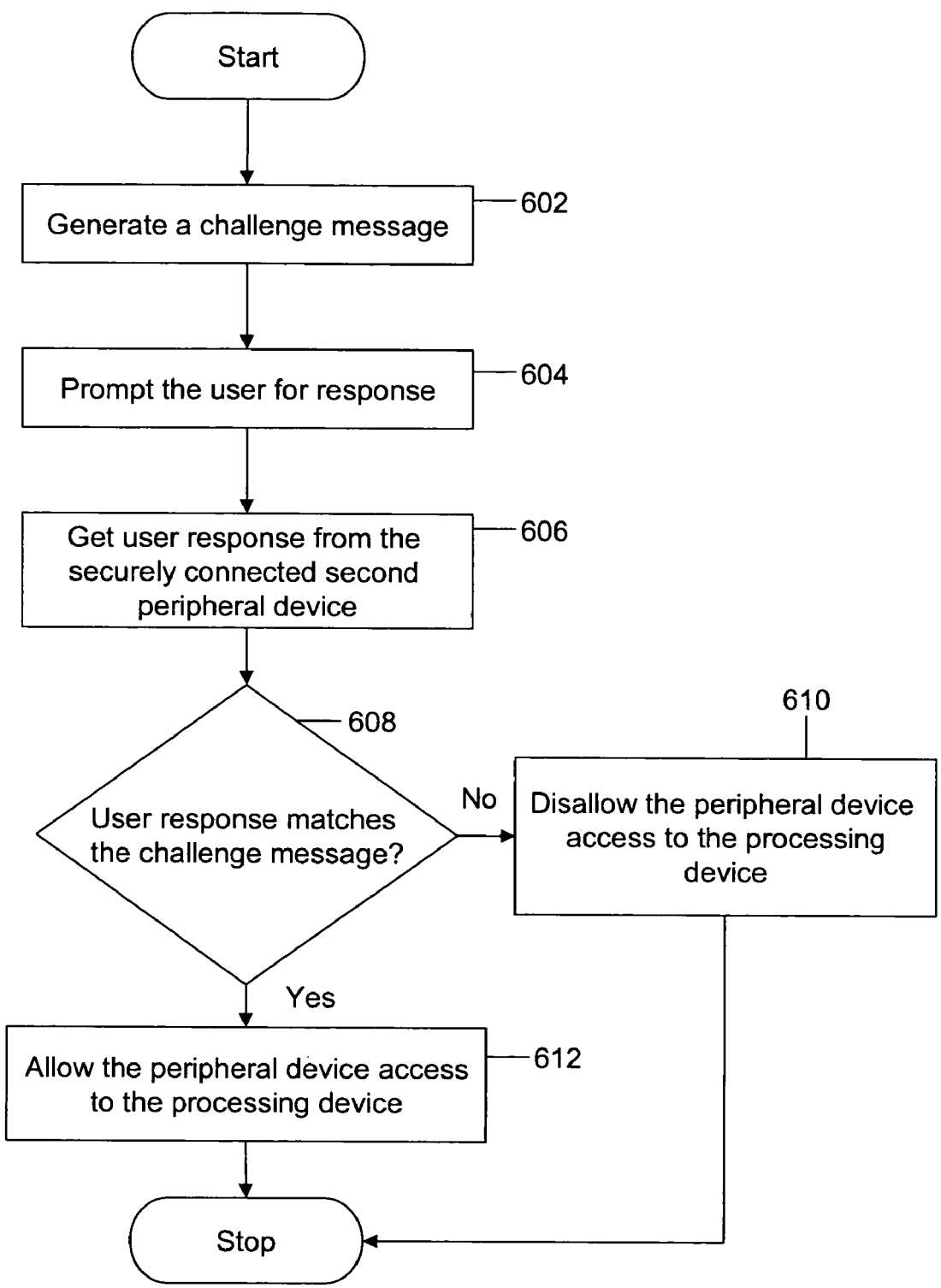
FIG. 6 is a flowchart depicting a detailed method for connecting a peripheral device to a processing device, using a second peripheral device, in accordance with an exemplary embodiment of the present invention.

FIG. 6 illustrates a flowchart of the detailed method for connecting peripheral device 504 to processing device 102, using securely connected peripheral device 502, in accordance with an exemplary embodiment of the present invention. Peripheral device 504 makes the request for access to processing device 102. At step 602, a challenge message is generated. Subsequently, processing device 102 prompts the user to respond to the challenge message at step 604. In an embodiment of the invention, the display device is used to prompt the user. The user responds to the challenge message by using securely connected peripheral device 502, i.e., the user enters the response via securely connected peripheral device 502. At step 606, the user's response is received by processing device 102. Thereafter, the user's response is matched to the challenge message at step 608. Peripheral device 504 is allowed access to processing device 102 if matching has been successful at step 612; otherwise, access is disallowed at step 610.

For the embodiments of the invention described above, processing device 102 (or its software) are also capable of implementing a device-binding policy, whereby peripherals devices such as keyboard 106 can be considered as 'unauthorized' at particular events. For example, after a period of inactivity (i.e., the period during which the devices were not communicating); after a fixed period of time, after the user logs out; after specific keystroke combinations are detected or a communication-link disruption occurs (for example, power down, device failure, network overload, etc.); processing device 102 could consider the peripheral device as unauthorized. The peripheral device considered 'unauthorized' is disallowed access to processing device 102, for the purpose of providing legitimate input signals.

To summarize, the embodiments of the invention provide methods and systems to enable securely connecting, associating, or binding a computer input/output (I/O) peripheral device to a processing device via a human user. In these methods, there are pass-codes, in the form of challenge messages, which are exchanged by the processing device and the peripheral device. The user mediates this pass-code exchange.

Further, the processing device may be able to transmit challenge messages to the peripheral device, and the peripheral device may be able to transmit challenge messages to the processing device. Similarly, each of the processing device and the peripheral device may be able to transmit challenge responses to each other. Moreover, each of the processing device and the peripheral device can transmit a message to each other requesting to initiate a challenge-response protocol. In an embodiment of the invention, the challenge response protocol may be a set of rules for securely connecting the peripheral device to the processing device. For example, the user may attempt to use the peripheral device (for example, a keyboard) either normally or by pressing a special 'bind-to-computer' button (for example a function key on the keyboard). The peripheral device can transmit normal inputs to the computer or a binding request. The processing device can transmit a rejection/binding request in response to the normal inputs. Further, the processing device can display the rejection to the user via some other output device such as a visual display or an audible signal.

Embodiments of the present invention have the advantage that there is an enhanced security for connecting a peripheral device to a processing device. Moreover, existing wireless peripheral devices may be used with enhanced security. The system of the present invention is lightweight and do not require heavy system resources. The method is easy to implement and use. The embodiments of the present invention provide a low cost method of enhancing the security for connecting a peripheral device to a processing device.

Although the invention has been discussed with respect to specific embodiments thereof, these embodiments are merely illustrative, and not restrictive, of the invention. For example, a 'method for secure connection of peripheral device' can include any type of analysis, manual or automatic, to anticipate the needs of security.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain and store, the program for use by or in connection with the instruction execution system apparatus, system or device. The computer readable medium can be, by way of example only but not by limitation, a semiconductor system, apparatus, system, device, or computer memory. The computer readable medium may have suitable instructions for synchronously presenting multiple video program ID streams, such as on a display screen, or for providing for input or presenting in accordance with various embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment","in an embodiment",or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a","an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims

What is claimed is:

1. A method of forming a first secure connection of a first wireless peripheral device to a processing device on a communication network, the method comprising:
    generating a challenge message from the processing device in response to a request from the first wireless peripheral device to form the first secure connection, the challenge message being based on characteristics of the first wireless peripheral device;
    prompting a user of the first wireless peripheral device for authentication of the challenge message;
    receiving a user entered response via a second wireless peripheral device in response to the prompting for authentication of the challenge message, wherein the second wireless peripheral device is coupled to the processing device via a second secure connection;
    allowing the first wireless peripheral device an access to the processing device to form the first secure connection in response to the challenge message matching the received user response, the access remaining allowed until occurrence of a predetermined event;
    disallowing the access of the first wireless peripheral device to the processing device in response to the challenge message mismatching the received user response; and
    providing a status indication to the user of the first wireless peripheral device to indicate a status of the request to form the first secure connection to the processing device, wherein the status indication comprises an audible signal.

2. The method of claim 1, wherein the challenge message comprises a device identification string of the first wireless peripheral device.

3. The method of claim 1, wherein the challenge message comprises a random set of characters generated by the processing device.

4. The method of claim 1, wherein the prompting the user for authentication comprises displaying the challenge message to the user on a display screen coupled to the processing device.

5. The method of claim 1, further comprising disallowing the first wireless peripheral device the access to the processing device in response to the first wireless peripheral device not being used for a predefined period of time.

6. The method of claim 1, further comprising disallowing the first wireless peripheral device the access to the processing device after a predefined fixed interval of time.

7. The method of claim 1, wherein the predetermined event comprises the user logging out of the first wireless peripheral device.

8. The method of claim 1, wherein the predetermined event comprises a specific keystroke combination being entered at the first wireless peripheral device.

9. The method of claim 1, wherein the predetermined event comprises a disruption in the communication network.

10. The method of claim 1, further comprising initiating the generation of the challenge message by using a predetermined control on the first wireless peripheral device.

11. A system configured to form a first secure connection of a first wireless peripheral device to a processing device on a communication network, the system comprising:
- means for generating a challenge message from the processing device in response to a request from the first wireless peripheral device to form the first secure connection, wherein the challenge message is based on characteristics of the first wireless peripheral device;
- means for prompting a user of the first wireless peripheral device for authentication of the challenge message;
- means for receiving a user entered response via a second wireless peripheral device in response to the prompting for authentication of the challenge message, wherein the second wireless peripheral device is coupled to the processing device via a second secure connection;
- means for allowing the first wireless peripheral device an access to the processing device to form the first secure connection in response to the challenge message matching the received user response, the access remaining allowed until occurrence of a predetermined event;
- means for disallowing the access of the first wireless peripheral device to the processing device in response to the challenge message mismatching the received user response; and
- means for providing a status indication to the user of the first wireless peripheral device to indicate a status of the request to form the first secure connection to the processing device, wherein the status indication comprises an audible signal.

12. A system configured to form a first secure connection of a first wireless peripheral device to a processing device on a communication network, the system comprising:
- a request sender configured for initiating an access request from the first wireless peripheral device to the processing device to request formation of the first secure connection;
- a request receiver configured for receiving the access request made by the first wireless peripheral device;
- a challenge message generator configured for generating a challenge message from the processing device for prompting a user of the first wireless peripheral device for a response, wherein the challenge message is based on characteristics of the first wireless peripheral device; and
- a response authorizer configured for matching the challenge message to the user response which is entered by the user via a second wireless peripheral device that is coupled to the processing device via a second secure connection, and connecting the first wireless peripheral device to the processing device to form the first secure connection if the user response matches the challenge message, wherein the first secure connection is maintained until occurrence of a predetermined event, the response authorizer further providing a status indication to the user of the first wireless peripheral device to indicate a status of the access request to form the first secure connection to the processing device, wherein the status indication comprises an audible signal.

13. The system of claim 12, further comprising a challenge message displayer coupled to the processing device for displaying the challenge message to the user.

14. A non-transitory computer-readable storage medium including instructions configured to form a first secure connection of a first wireless peripheral device to a processing device on a communication network, the instructions executable by the processing device, the computer-readable storage medium comprising:
- one or more instructions for generating a challenge message from the processing device in response to a request from the first wireless peripheral device to form the first secure connection, the challenge message being based on characteristics of the first wireless peripheral device;
- one or more instructions for prompting a user of the first wireless peripheral device for authentication of the challenge message;
- one or more instructions for receiving a user entered response via a second wireless peripheral device in response to the prompting for authentication of the challenge message, wherein the second wireless peripheral device is coupled to the processing device via a second secure connection;
- one or more instructions for allowing the first wireless peripheral device an access to the processing device to form the first secure connection in response to the challenge message matching the received user response, the access remaining allowed until occurrence of a predetermined event;
- one or more instructions for disallowing the access of the first wireless peripheral device to the processing device in response to the challenge message mismatching the received user response; and
- one or more instructions for providing a status indication to the user of the first wireless peripheral device to indicate a status of the request to form the first secure connection to the processing device, wherein the status indication comprises an audible signal.

15. An apparatus configured to control a first secure connection with a first wireless peripheral device on a communication network, the apparatus comprising:
- a processing device; and
- logic encoded in one or more tangible media for execution by the processing device, and when executed configured to:
  - generate a challenge message from the processing device in response to a request from the first wireless peripheral device to form the first secure connection, wherein the challenge message is based on characteristics of the first wireless peripheral device;
  - prompt a user of the first wireless peripheral device for authentication of the challenge message;
  - receive a user entered response via a second wireless peripheral device in response to the prompting for authentication of the challenge message, wherein the second wireless peripheral device is coupled to the processing device via a second secure connection;
  - allow the first wireless peripheral device an access to the processing device to form the first secure connection in response to the challenge message matching the received user response, the access remaining allowed until occurrence of a predetermined event;
  - disallow the access of the first wireless peripheral device to the processing device in response to the challenge message mismatching the received user response; and
  - provide a status indication to the user of the first wireless peripheral device to indicate a status of the request to form the first secure connection to the processing device, wherein the status indication comprises an audible signal.

16. The apparatus of claim 15, wherein the predetermined event comprises the user logging out of the first wireless peripheral device.

17. The apparatus of claim 15, wherein the predetermined event comprises a specific keystroke combination being entered at the first wireless peripheral device.

18. The apparatus of claim 15, wherein the predetermined event comprises a disruption in the communication network.

* * * * *